Nov. 4, 1958
J. E. BLACK
2,858,714
MULTI-SPEED DRIVE FOR VEHICLE
Filed Nov. 30, 1954
3 Sheets-Sheet 1
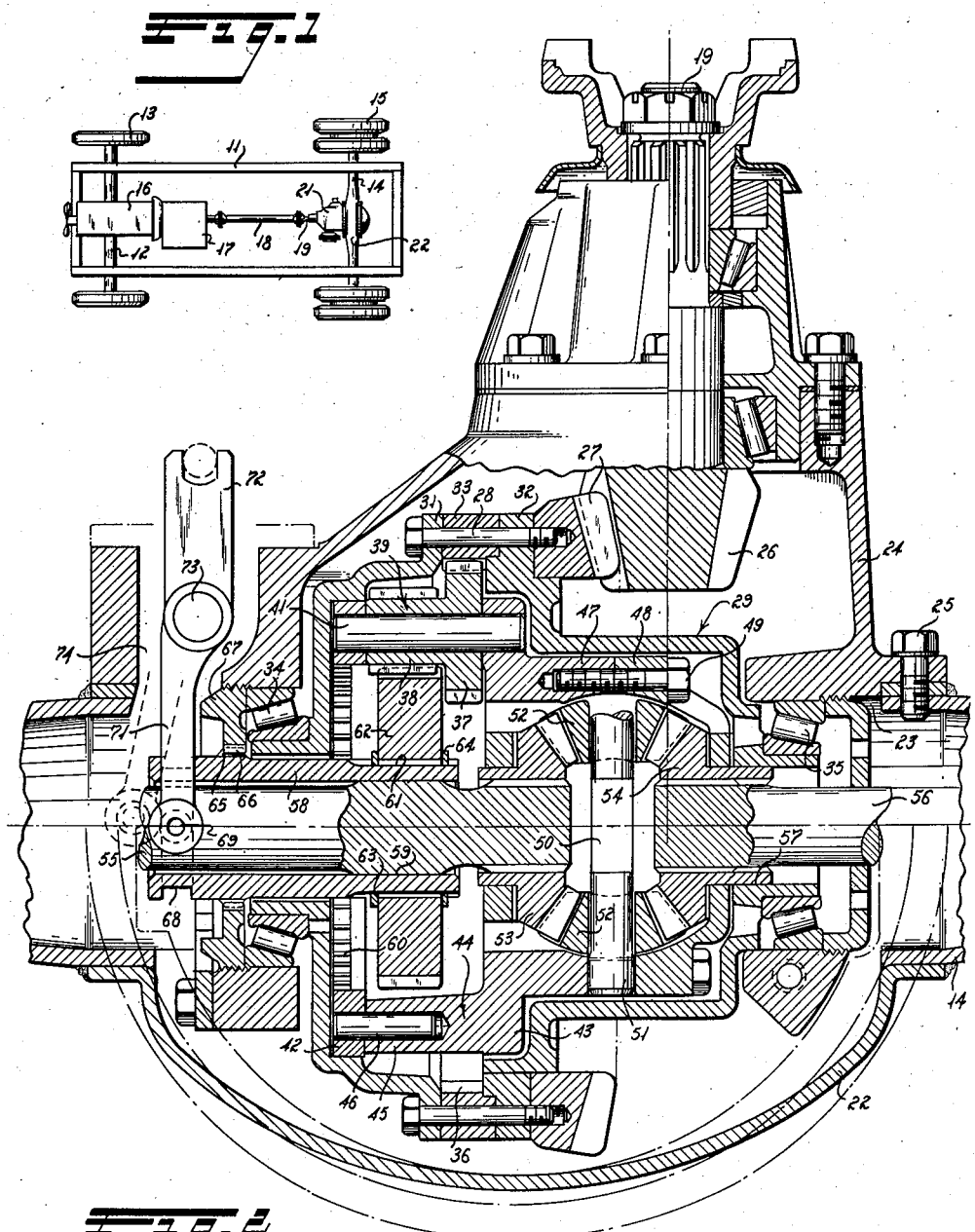
INVENTOR
JAMES E. BLACK
BY
ATTORNEYS Nov. 4, 1958  J. E. BLACK  2,858,714
MULTI-SPEED DRIVE FOR VEHICLE
Filed Nov. 30, 1954  3 Sheets-Sheet 2
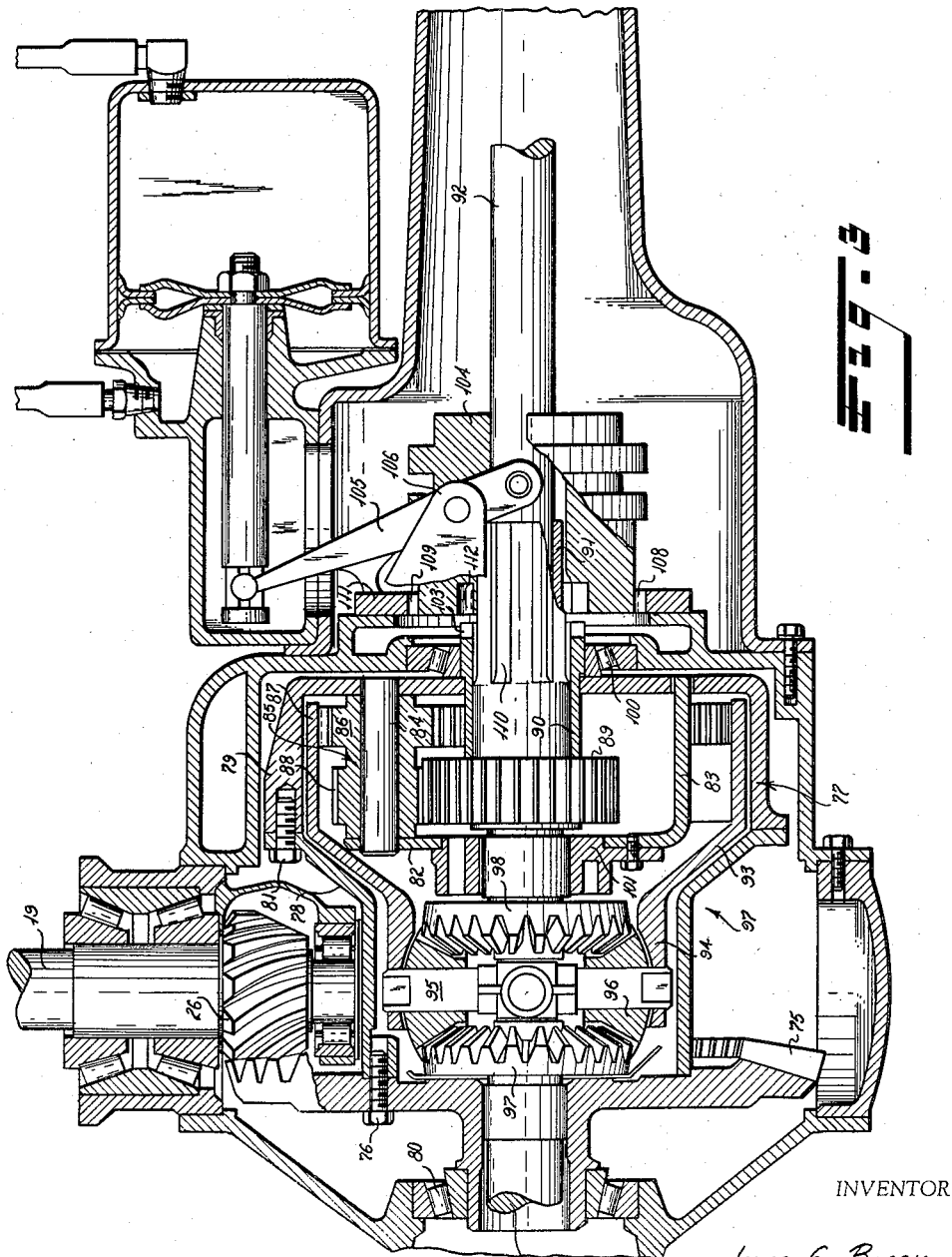
INVENTOR
James E. Black
BY Strauch, Nolan & Diggins
ATTORNEYS

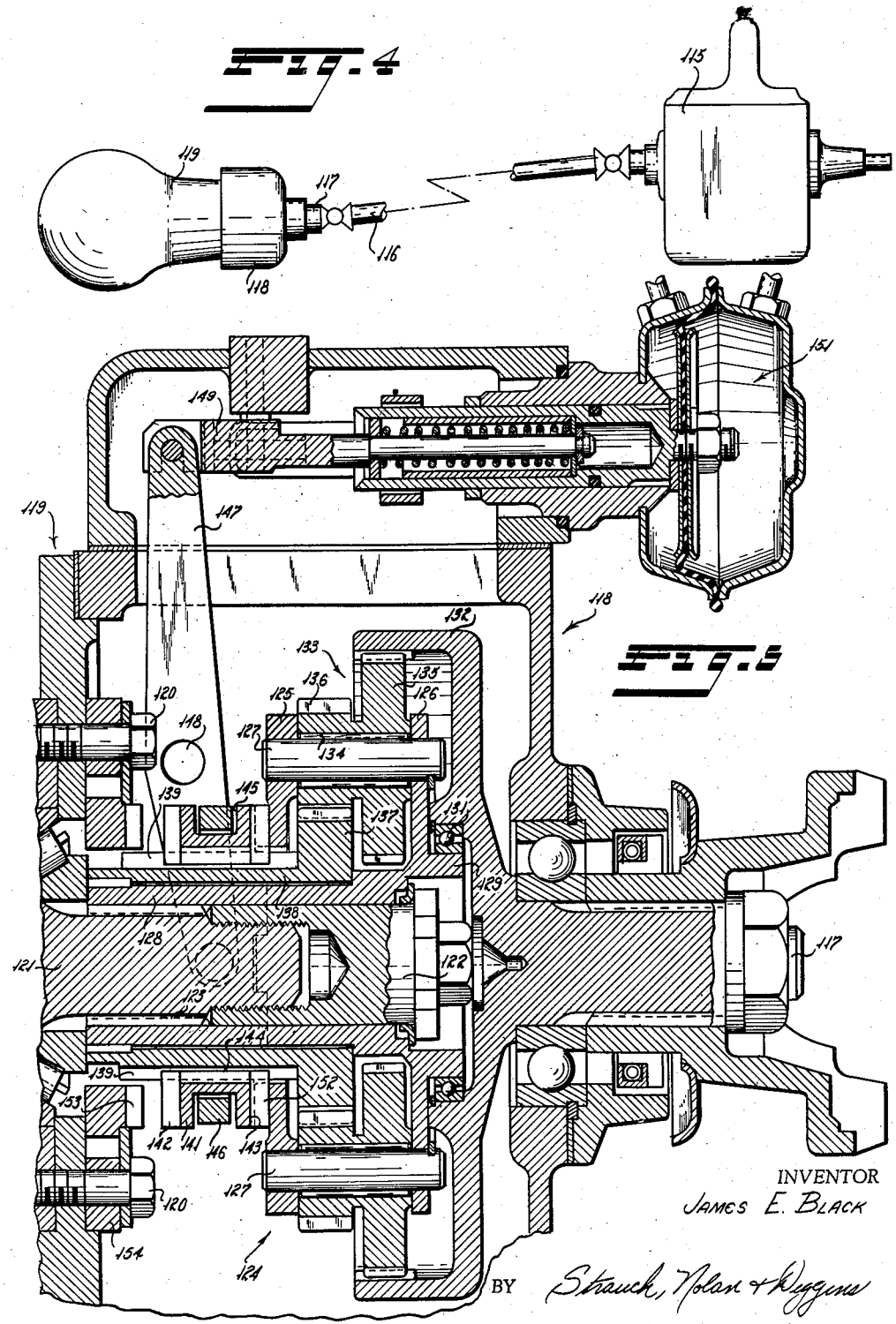

United States Patent Office 2,858,714
Patented Nov. 4, 1958

2,858,714

MULTI-SPEED DRIVE FOR VEHICLE

James E. Black, Detroit, Mich., assignor to Rockwell Spring and Axle Company, Coraopolis, Pa., a corporation of Pennsylvania Application November 30, 1954, Serial No. 471,953

6 Claims. (Cl. 74—740)

This invention relates to improvements in drive mechanism for road vehicles and is particularly concerned with such drive mechanism wherein special wide ratio spread two speed drive axle mechanism is incorporated into the drive train between the engine driven change speed transmission and the road engaging wheels for obtaining optimum speed ratio selection during all conditions of operation of the vehicle.

In heavy duty vehicles which encounter various road grade conditions under different load conditions it is desirable to provide available speed ratio selection between the engine and drive axle for most efficient engine operation under existing conditions. There has been constant change and improvement in the past including the significant advance of providing in the drive train a two speed gear box between the usual transmission and the usual rear axle mechanism to effectively double the available speed ratios. Various spacing of the transmission ratios has been proposed in an attempt to secure optimum ratio spacing in the overall combination but some of these changes required expert driver skill not always available.

It was not until the development of the markedly new wide spread dual range axle having a drive reduction ratio spread of about two to one such as that disclosed in Brownyer application No. 422,031 filed April 9, 1954 that a really adequate combination was proposed. The present invention may be regarded as a further improvement in this direction and in its preferred embodiment a special planetary two speed axle having about a two to one drive reduction ratio is provided to coact with the transmission in providing the required staging of drive speed ratios and minimum driver actuation.

It is therefore the primary object of this invention to provide the novel combination of a variable speed transmission and a planetary gear two speed drive axle having about a wide ratio spread to provide a series of optimum vehicle drive ratio steps.

A further object of the invention is to provide a drive train containing the novel combination of an automatic transmission and a two speed drive axle having about a two to one drive ratio spread.

A further object of the invention is to provide a novel combination vehicle drive train consisting essentially of an automatic variable speed transmission and a shiftable two-speed planetary gear mechanism having wide spread drive ratios. This two-speed planetary gear mechanism is preferably in the rear axle according to a more specific object.

It is a further object of the invention to provide a novel shiftable two speed planetary gear drive axle having wide spread drive ratios.

Further objects of the invention will appear as the description proceeds in connection with the appended claims and the annexed drawings wherein:

Figure 1 diagrammatically illustrates a vehicle incorporating the drive of the present invention;

Figure 2 is a section through the underdrive planetary gearing of the drive axle of Figure 1;

Figure 3 is a section through an overdrive planetary drive axle that may be optionally used in the vehicle of Figure 1;

Figure 4 is a diagrammatic view of a vehicle drive train according to the invention wherein the planetary reduction gearing is mounted on the nose of the differential carrier of the drive axle; and Figure 5 is a section through the planetary reduction gearing of Figure 4.

Figure 1 illustrates a vehicle embodying a chassis 11 supported by a front axle 12 having dirigible wheels 13 and a rear axle 14 having road engaging wheels 15. An engine 16 has its output end coupled to a variable speed ratio transmission 17, which in this embodiment is preferably an automatic transmission such as that known by the trade name Hydramatic and wherein variations in engine speed selectively control shifting of the drive gearing to the various drive speed ratios. Propellor shaft 18 which embodies the usual universal joints connects transmission 17 to a rear axle input shaft 19 mounted on the differential carrier portion 21 of the rear drive axle housing 22.

As above stated the automatic transmission 17 preferably is of the Hydramatic type as above explained, and may be that disclosed either in United States Letters Patent No. 2,645,135 or that disclosed in Patent No. 1,028,976 issued to General Motors Company in France, these patents being included by reference for any detail of disclosure. However any equivalently functioning automatic transmission may be employed. It is within the scope of the present invention to here use in combination with the planetary drive axle the transmission disclosed in said Serial No. 422,031 comprising spaced high and low speed ratio groups.

Referring to Figure 2 the axle housing 22 has a front opening 23 over which is mounted a differential carrier 24 as by bolts 25. Carrier 24 thus forms a part of the axle housing. Shaft 19 is journalled on carrier 24 in suitable bearings and carries a bevel or hypoid pinion 26 meshed with bevel ring gear 27 which is secured as by bolts 28 to the casing or housing 29. Housing 29 consists of end members 31 and 32 spaced by an internal ring gear 33, all secured together by bolts 28. End members 31 and 32 terminate in coaxial hubs journalled in bearings 34 and 35 respectively on carrier 24, whereby the planet housing 29 is freely rotatable about the longitudinal axis of the axle.

The internal teeth 36 of ring gear 33 are meshed with planet gears 37 which are larger than and rigid with smaller coaxial planet gears 38. Preferably corresponding planet gears 37 and 38 comprise integral compound gear units designated at 39 journalled on pins 41 having their ends fixed in side members 42 and 43 of a planet gear carrier 44. Side members 42 and 43 are spaced by integral projections 45 on one of them and secured together as by a series of studs 46. Preferably there are three such equally circumferentially spaced pins 41 and three such compound planet gear units.

Side member 43 has an integral axial extension 47 within the planet housing which serves as one half of the differential cage and is secured to the other half 48 of the differential cage as by bolts 49 so as to clamp spider 50 between the cage halves. Spider 50 has four arms 51 on which pinions 52 are journalled, and pinions 52 are meshed with side gears 53 and 54 non-rotatably splined on the adjacent ends of coaxial axle shafts 55 and 56 respectively. Side gear 54 has its hub journalled and supported at 57 in the hub of housing member 32.

A sleeve 58 is axially slidably supported on a smooth cylindrical section 59 of axle shaft 55 and is splined at its inner end at 61 for non-rotatably mounting a sun gear 62 mesh with gears 38 of each compound planet gear unit. Snap rings 63 and 64 in suitable annular sleeve grooves at opposite sides of sun gear 62 prevent axial displacement of sun gear 62 with respect to sleeve 58 but they permit a slight radial float of sun gear 62 to insure even tooth wear during operation. A row of clutch teeth 60 are provided on the side member 42 of the carrier 44 in axial alignment with the sun gear.

Outwardly of bearing 34 sleeve 58 is formed with an annular row of clutch teeth 65 adapted to engage clutch teeth 66 of ring 67 which is rigid with the casing 24 so that when sleeve 58 is in the Figure 2 position the sun gear is locked to the axle housing for a purpose to appear. Preferably teeth 66 are formed on the inner periphery of ring 67 which also is externally threaded with the casing and functions as a retainer and bearing adjustment at 34.

Outwardly of clutch teeth 65 sleeve 58 is formed with an annular groove 68 in which are disposed pins 69 of a conventional type shift yoke 71 at one end of a shift lever 72 pivoted at 73 upon the axle housing, an opening 74 being provided to accommodate lever 72 and its movement about pivot 73 between the full line and dotted line positions of Figure 2. A suitable seal arrangement is provided for keeping dirt from entering at opening 74. Lever 72 is actuated between its two illustrated positions by a suitable control mechanism accessible to the driver.

In operation rotation of propellor shaft 18 from the output of the transmission causes rotation of planet housing 29 through pinion 26 and ring gear 27. When the sleeve 58 is in the position shown in Figure 2 with clutch teeth 65 and 66 engaged, sun gear 62 is fixed against rotation and the planet gear units roll around it during rotation of planet housing 29 and the differential cage is driven at a predetermined speed reduction depending upon the gear sizes. This is the underdrive position of the axle assembly.

When sleeve 58 is shifted to the left in Figure 2 clutch teeth 65 and 66 are disengaged and the sun gear 62 meshes with carrier teeth 60 so that the differential cage rotates with the planet housing. This is the direct drive position of the axle assembly.

I have found that the compound planetary gear mechanism herein illustrated provides a compact efficient drive wherein direct drive and underdrive speed ratios bear approximately a two to one relation. For example in the construction of Figure 2, the combination of ring gear (80 teeth), larger planet gear section 37 (20 teeth), smaller planet gear section 38 (12 teeth) and sun gear 62 (48 teeth) provides the desired 2 to 1 spread between direct and underdrive speed ratios.

This underdrive axle is of particular utility for vehicles having relatively high speed gasoline engines at 16.

Since no split shifting is required on the part of the operation, the entire operation is smooth and easy and the clutch mechanism in the axle will last longer because of reduced wear. In general it will be found best to keep the axle in low drive under load and during slow speed town conditions, while it can be kept in high drive when not under load and during most road conditions. In operation the vehicle drive passes through a series of relatively short step ratio drives, whereby the engine efficiency is increased and the vehicle handles easily with no added driver skilled required.

Figure 3 illustrates the invention as applied to an overdrive planetary axle such as is used in vehicles powered by relatively low speed diesel engines.

In this embodiment the pinion 26 on input shaft 19 is meshed with a ring gear 75 secured as by bolts 76 to the planet gear carrier 77. Carrier 77 comprises members 78 and 79 secured together as by bolts 81 and an internal spaced member 82 having a lateral portion 83 fixed to member 79. A plurality of pins 84 extend non-rotatably between carrier members 79 and 82, and compound planet units 85 are rotatably mounted on these pins, usually three or four in number depending on the axle design. At one end carrier 77 is journalled in bearings 80 on the axle housing. At the other end, member 79 has secured to it a tubular extension 90 that is supported in bearings 100 and which is provided with clutch teeth 103 at its axial outer end.

Each compound planet unit comprises a large gear 86 meshed with a ring gear 87, and a small gear 88 meshed with a sun gear 89 which in turn is mounted on a sleeve 91 freely rotatably mounted about the inner end of axle shaft 92. Ring gear 87 is mounted on the planet gear housing 93 which is integral with the differential cage 94 that mounts spider 95. On the arms of the spider are journalled pinions 96 meshed with side gears 97 and 98 fixed on axle shafts 99 and 92. Axle shaft 92, intermediate side gear 98 and sun gear 89, is supported in a bearing assembly 101 removably secured to planet carrier member 82.

Sleeve 91 extends freely through the planet carrier. A clutch collar 104 operated by a yoke 105 pivoted to the axle housing at 106 and actuated by a fluid pressure motor 107 is slidably but non-rotatably mounted on sleeve 91 as by splines 110.

Collar 104 has a row of external clutch teeth 108 meshed with internal teeth 109 of a ring 111 fixed on the axle housing when the parts are in the position of Figure 3, and a row of internal teeth 112 adapted to mesh with teeth 103 of the tubular extension 90 when the clutch collar is shifted to the left in Figure 3.

With the axle shift in the position shown in Figure 3 power is transmitted through shaft 19, pinion 26, ring gear 75, the planet gear carrier 77, planet gear units 85 and ring gear 87 to the differential. Since clutch collar 104 here locks sleeve 91 and the sun gear against rotation the differential is driven in overdrive. When the clutch collar 104 is shifted to the left in Figure 3 to mesh teeth 103 and 112, clutch teeth 108 and 109 are disengaged and the differential is driven in direct drive. The drive speed ratios in overdrive and direct are approximately in two to one relation.

Referring now to Figures 4 and 5, the invention is illustrated as incorporated in a two speed gear box mounted on the nose of an axle differential carrier.

Figure 4 illustrates a variable speed transmission 115, which may be an automatic transmission or one of the transmissions disclosed in said Serial No. 422,031 connected by propellor shaft 116 to the input shaft 117 of a two speed gear box assembly 118 mounted on the differential portion 119 of a drive axle.

In this embodiment shaft 117 is coaxial with the usual pinion shaft 121 of the drive axle gearing which projects into the gear box removably mounted on the axle housing differential carrier portion 119 as by bolts 120. A shaft extension 122 is non-rotatably fixed as by threading and staking onto the end of pinion shaft 121, the latter being formed with splines 123.

A planet gear carrier 124 comprises parallel side members 125 and 126 secured together in fixed spaced relation and bridged by a series of pins 127 that have their ends secured to the carrier. Member 126 has a hub extension 128 internally splined on the shaft splines 123 and an opposite extension 129 supported in a bearing 131 carried by a ring gear 132 rigid with the inner end of shaft 117. If desired the internal splines on hub extension 128 may be extended to coact with suitable external splines on extension 122.

A series of compound planet gear units 133 are mounted on needle bearings 134 on pins 127. Each compound planet gear unit comprises a large gear 135 meshed with ring gear 132 and a smaller gear 136 meshed with a sun gear 137. The sun gear 137 is integral with one end of a sleeve 138 suitably mounted for rotation about hub extension 128, and sleeve 138 is externally splined at 139. Alternatively the splines 139 may be continued to the end of sleeve 138 and a separate sun gear 137 splined thereon and held against longitudinal shift.

A clutch collar 141 has clutch teeth 142 and 143 on opposite ends, and is internally splined at 144 to shift axially on splines 139 of the sleeve. Collar 141 is grooved at 145 to receive a yoke 146 pivoted to an actuating lever 147 that is pivoted to the box 118 at 148 and connected at its upper end to the reciprocable shaft 149 of a fluid pressure motor assembly 151.

In the illustrated position of Figure 5, clutch collar teeth 143 are meshed with teeth 152 on the planet carrier whereby a direct drive is obtained from shaft 117 to shaft 121. When collar 141 is shifted to the left in Figure 5 to mesh teeth 142 with teeth 153 of a clutch ring assembly 154 mounted on the carrier housing by bolts 120, sun gear 137 is locked against rotation and an underdrive relation is provided between shaft 117 and shaft 121, the gear ratios being such that the drive speed in underdrive is about one-half that of direct.

In the illustrated axle assembly I obtain the desired two to one ratio spread by providing ring gear 132 with 78 teeth, planet 135 with 24 teeth, planet 136 with 12 teeth, and sun gear with 39 teeth.

Apart from the compound planetary gear units, this structure is preferably that disclosed in Serial No. 374,208 filed August 14, 1953 to which reference is made for any further necessary detail. In the clutch ring assembly 154 the inner ring portion carrying teeth 153 has slight rotational float between stops to take care of shock. In the alternative I may provide an integral clutch ring that has no such float but is resiliently backed as in Serial No. 414,955 filed March 9, 1954.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle drive train embodying a multiple speed transmission comprising shiftable gearing providing a plurality of ratio reductions of predetermined spacing; a relatively lightweight variable speed planetary drive axle effective in cooperation with such transmission when drive-connected thereto to provide a progressive series of selectable over-all drive train ratio reductions of greater number than said plurality of transmission ratio reductions without the necessity of split shifting and with relatively low axle torque input requirements; said axle embodying selective gearing providing at least two speed ratio drives of predetermined wide spacing and comprising a housing, a differential mechanism within said housing, a planetary gearing assembly in said housing having an input shaft and an output drive connected to said differential mechanism, said planetary gearing comprising a ring gear and a sun gear and a plurality of compound planet gear units each consisting of different sized gears mounted on a rotatable carrier and meshed respectively with the ring gear and the sun gear, and means for selectively connecting said sun gear to said carrier or to said housing to obtain respectively a modified speed drive ratio and a direct drive between said shaft and said differential mechanism; the spacing of said axle ratios being sufficiently great to span a plurality of at least the lowermost (numeric) ratio reductions of such transmission whereby, in a transmission equipped drive train embodying such axle, by starting with the axle drive selected for its lower speed ratio and shifting through the entire transmission range, then shifting the drive axle to its higher speed ratio and the transmission back to the highest of said plurality of at least the lowermost ratio reductions and then normally shifting only the transmission toward its lowest (numeric) ratio reduction, a series of successively decreasing vehicle drive train over-all ratio reductions is obtained and whereby the high (numeric) over-all drive train ratio reductions may be provided by the coaction of the axle lower speed ratio with the transmission ratio reductions and the low (numeric) over-all drive train ratio reductions may be provided by the coaction of the axle higher speed ratio with the plurality of transmission lowermost ratio reductions thereby maintaining the torque input requirements of said axle relatively low.

2. In the drive mechanism defined in claim 1, said modified drive being an underdrive.

3. In the drive mechanism defined in claim 1, said modified drive being an overdrive.

4. In the drive mechanism defined in claim 1, the larger of said different sized gears being meshed with the ring gear.

5. The axle drive mechanism defined in claim 1 wherein said gearing is such that the drive speed ratio spread is at least approximately two to one.

6. A roadway vehicle drive train effective to provide a progressive series of selectable over-all drive train reduction ratios without the necessity of split shifting while minimizing the drive train axle torque input requirements, an automatic variable speed transmission comprising shiftable gearing providing a plurality of speed reduction ratios of predetermined spacing and embodying automatic controls for selecting the output drive speeds in accord with the engine speed, and a variable speed drive axle operatively connected to said transmission, said drive axle comprising selective gearing providing at least two speed ratio drives of predetermined spacing; the spacing of said axle ratios being such in relation to the spacing of said transmission ratios that by starting with the axle drive selected for its lower speed ratio and shifting through the entire transmission range by control of the engine speed, then shifting the drive axle to its higher speed ratio and reducing the engine speed to permit the transmission to automatically shift back to a predetermined speed setting in its range which is at least a plurality of speeds below its highest speed, and then normally automatically shifting only the transmission under control of the engine speed toward said highest speed, a series of successively increasing short step vehicle drive speed ratios whereby the high (numeric) over-all drive train ratio reductions are all provided under engine speed control by the coaction of said axle lower speed ratio with the ratio reductions of said transmission and the low (numeric) over-all drive train ratio reductions are provided under engine speed control by the coaction of the axle higher speed ratio with the transmission ratio reductions providing said predetermined and higher speeds thereby minimizing the maximum torque input requirements of said axle for the given over-all drive train ratio reduction progressive series is obtained.

References Cited in the file of this patent

UNITED STATES PATENTS

| | | |
|---|---|---|
| Re. 17,039 | Burkhardt | July 17, 1928 |
| 1,165,915 | Sparks | Dec. 28, 1915 |
| 1,362,361 | Starr | Dec. 14, 1920 |
| 1,550,091 | Moorhouse | Aug. 18, 1925 |
| 1,958,788 | Harper | May 15, 1934 |
| 1,964,956 | Lincoln | July 3, 1934 |
| 2,993,544 | Fleischel | Mar. 5, 1935 |
| 2,075,980 | Fawick | Apr. 6, 1937 |
| 2,113,860 | Sanford | Apr. 12, 1938 |
| 2,225,720 | Snow | Dec. 24, 1940 |
| 2,398,407 | Brownyer | Apr. 16, 1946 |
| 2,637,221 | Backus et al. | May 5, 1953 |
| 2,645,135 | Frank | July 14, 1953 |
| 2,730,914 | Rockwell | Jan. 17, 1956 |

FOREIGN PATENTS

| | | |
|---|---|---|
| 2,337 | Great Britain | 1907 |